United States Patent [19]

Dunn

[11] Patent Number: 4,827,374
[45] Date of Patent: May 2, 1989

[54] FLIP OUT FUSE ASSEMBLY

[75] Inventor: John J. Dunn, Birmingham, Ala.

[73] Assignee: Electrical Equipment, Inc., Birmingham, Ala.

[21] Appl. No.: 123,252

[22] Filed: Nov. 20, 1987

[51] Int. Cl.⁴ .............................................. H02B 1/14
[52] U.S. Cl. .................................. 361/345; 200/50 A; 200/50 AA; 361/349
[58] Field of Search ............ 200/48 P, 48 A, 50 AA, 200/50 R, 50 A, 50 B; 312/322, 323; 361/338, 339, 340, 342, 345, 347, 349, 357, 359, 360, 391

[56] References Cited

U.S. PATENT DOCUMENTS

| | | | |
|---|---|---|---|
| 4,250,357 | 2/1981 | Hanke | 361/360 |
| 4,463,227 | 7/1984 | Dizon et al. | 361/347 |
| 4,688,145 | 8/1987 | Mikulecky | 361/347 |

Primary Examiner—A. D. Pellinen
Assistant Examiner—Gregory D. Thompson
Attorney, Agent, or Firm—Jennings, Carter, Thompson & Veal

[57] ABSTRACT

A dead front fuse mounting assembly supports the fuse on a hingedly mounted plate which can pivot through a 90° arc to allow access to the fuse. The plate can be latched in a circuit closed position and cannot be released therefrom until a high voltage elbow connector is removed from across a latch operator. Pivotal motion of the plate from the closed circuit position disengages the fuse from a second high voltage contact and releases a shutter to isolate this contact from the remainder of the fuse enclosure. The shutter is opened when the plate pivots back to its closed circuit position.

14 Claims, 3 Drawing Sheets

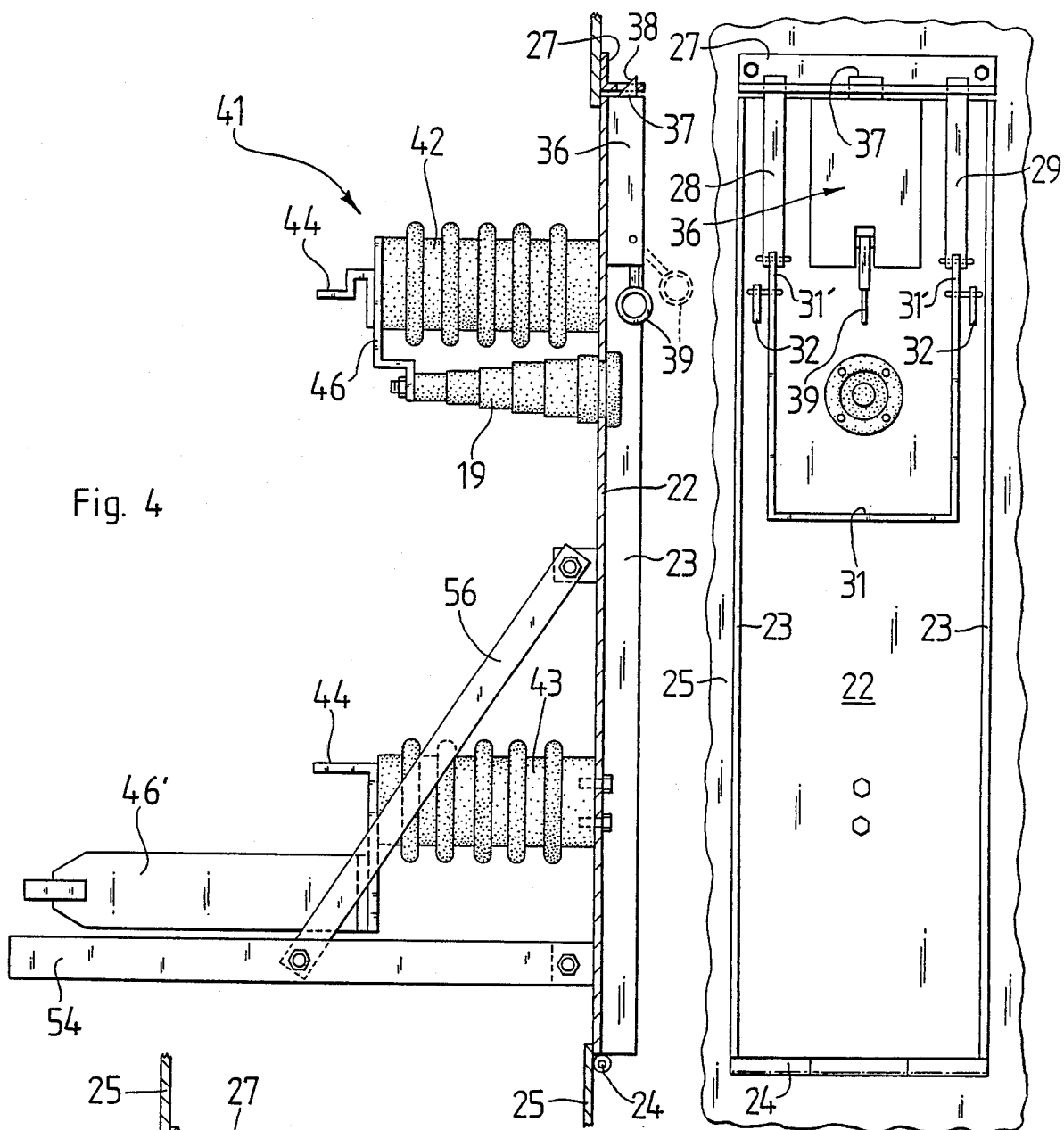
Fig. 4
Fig. 5
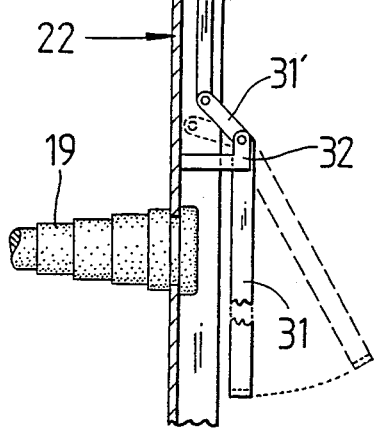
Fig. 6

FLIP OUT FUSE ASSEMBLY

FIELD OF THE INVENTION

The present invention relates to high voltage electrical equipment and more particularly to the confinement of replaceable components thereof such as fuses within a protective enclosure. Even more particularly the present invention relates to a mechanism for mounting fuses in an electrical system such that the circuit may be opened prior to disengaging the fuse from its contacts.

BACKGROUND OF THE INVENTION

High voltage electrical equipment is inherently dangerous, thus manufacturers of such equipment take precautions in designing the equipment to reduce the hazards presented thereby. Of particular concern in the design of such equipment is the safety of personnel who are required to work on such equipment. One area which personnel must routinely encounter is the fuse mounting and enclosure area. The fuses are replaceable circuit elements which must be readily removed and replaced in the circuit, thus necessitating opening and closing the circuit in what may be an energized condition. In as much as live parts are necessarily present at or near the fuse, these elements are oftentimes enclosed within protective cabinets. In some instances these cabinets have been made from metal with non-conductive barriers interposed therewithin. The present invention and its predecessors are of a particular genre known as "dead front" switchgear. Previous designs have utilized mounting panels which have supported the fuse elements in a common enclosure with an electrical contact, with the panel pivotally mounted such that the entire panel carrying the fuse pivoted 180° about a horizontal axis to position the fuse in a circuit open or circuit closed position. A complex linkage arrangement was used to actuate the mechanism, thus it was somewhat cumbersome. Further, the panel had to rotate the full 180°, otherwise personnel working on the switchgear would have an unreliable barrier between themselves and a live high voltage terminal.

SUMMARY OF THE INVENTION

It is the object of the present invention to provide a dead front fuse mounting which does not require complex linkages to operate and which provides a dependable means for placing a barrier between personnel and the high voltage contact.

Yet another object is to provide a dead front panel with a simple, yet efficient, interlock mechanism to prevent inadvertent panel openings.

These and other objects and advantages of my invention are accomplished by the use of a flip out mounting which trips a barrier sealing shutter whenever the fuse is moved to an open circuit position. Additionally, the fuse cannot be so moved until one side thereof has already been disconnected from the circuit.

BRIEF DESCRIPTION OF THE DRAWINGS

Apparatus embodying features of my invention are depicted in the accompanying drawings which form a portion of this disclosure and wherein:

FIG. 4 is a sectional view taken along line 4—4 of FIG. 1;

FIG. 5 is a front elevational view of the mounting plate;

FIG. 6 is a partial sectional view taken along line 6—6 of FIG. 1.

DESCRIPTION OF A PREFERRED EMBODIMENT

Figure 1:
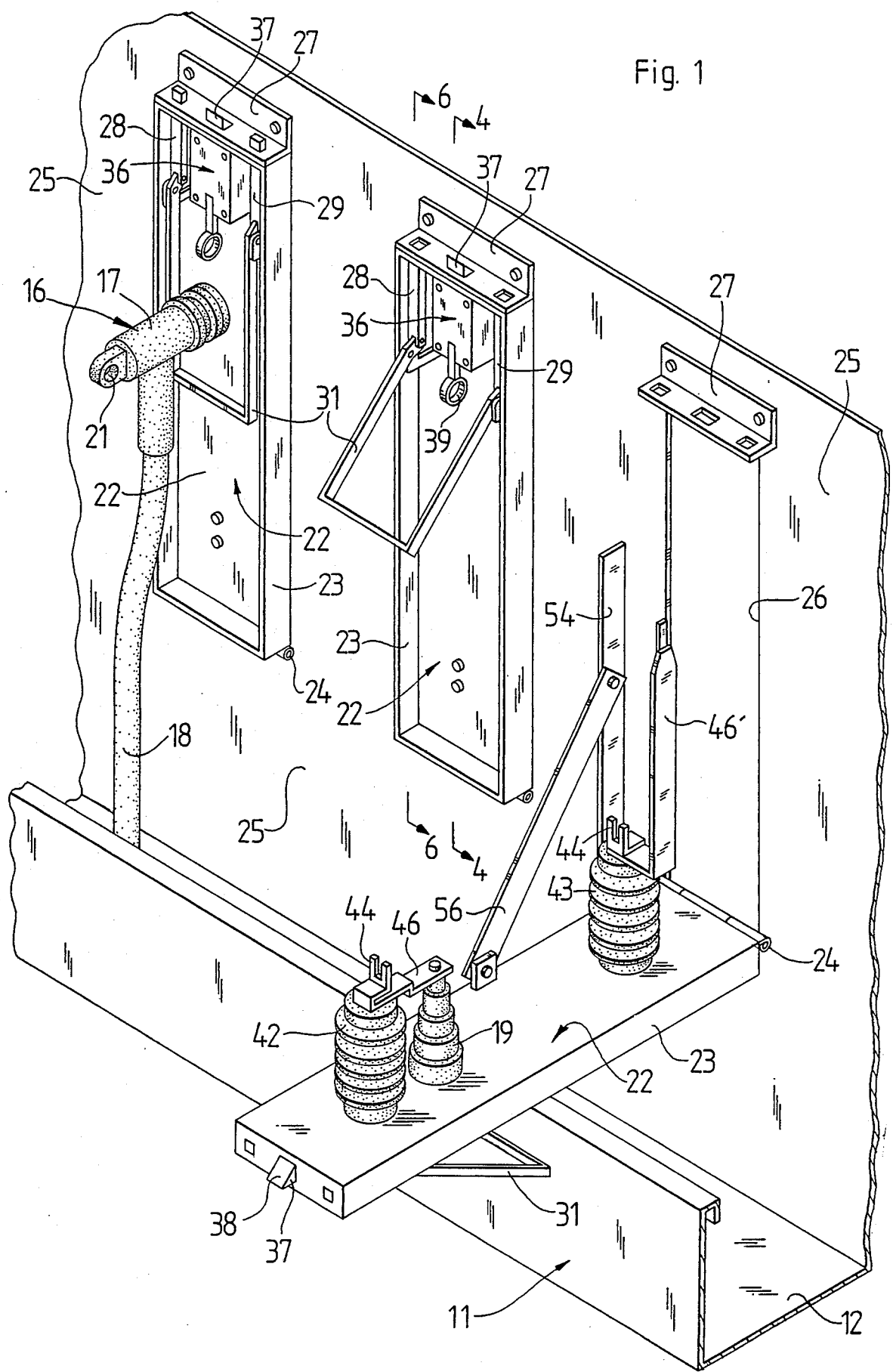
FIG. 1 is a partial perspective view of the front compartment of switchgear utilizing my apparatus.

Referring to the drawings for a better understanding of the invention, it should be noted that the present invention is an improvement over previous components used for similar purposes in high voltage electrical equipment, therefore it should be understood that the representation shown in the drawings are illustrative of the general nature of my invention and are not limited to specific associated electrical equipment. My apparatus is housed in an outer cabinet 11, partially shown in FIGS. 1–3, as is common practice in the industry. The cabinet 11 has a forward compartment 12, central compartment 13, and rear compartment 14. It should be understood that "forward" and "rear" merely serve to distinguish the outer compartments.

Figure 2:
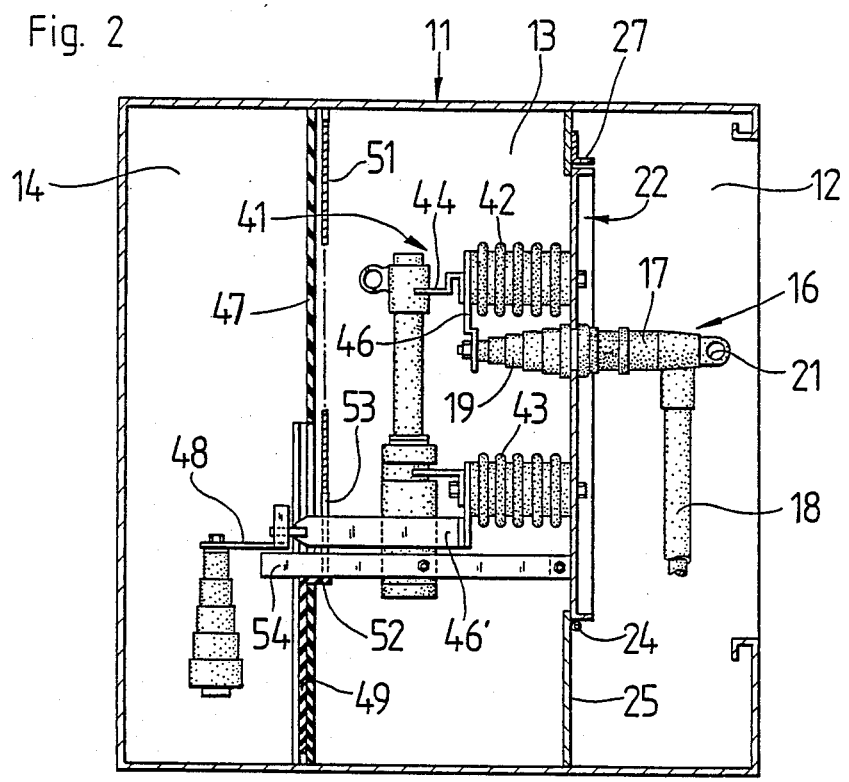
FIG. 2 is a sectional view in side elevation showing my apparatus within a protective enclosure in the circuit closed position.
Figure 3:
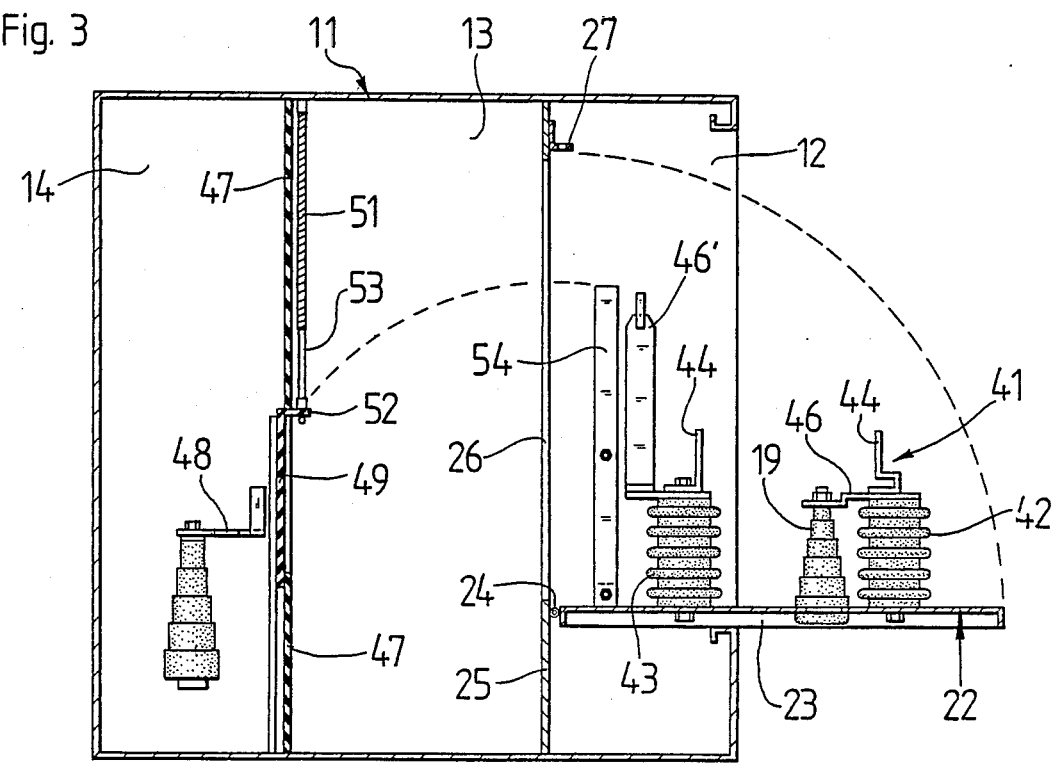
FIG. 3 is a sectional view in side elevation showing my apparatus in the circuit open position.

The forward compartment 12 encloses an elbow connector 16 for each phase of the high voltage circuit. Such elbow connectors are commonly used in the industry and will not be described in further detail, except to define a mating portion 17 and a line portion 18. The mating portion 17 includes a plug type connector which mate with a receptacle within a bushing 19, shown in FIG. 2. The mating portion has an eye 21 which may be engaged by a hot stick to disconnect it from the circuit. The bushing 19 is mounted on a plate-like member 22, having outer flanges 23 extending into compartment 12. Plate-like member 22 is hingedly mounted at 24 to a partition 25 wall separating forward compartment 12 and central compartment 13 and is dimensioned so as to fit over an opening 26 in the wall 25. As shown in FIGS. 1 and 3, the hinge-like mounting 24 permits the plate-like member 22 to pivot outwardly into compartment 12.

As may be seen in FIG. 6 mounted to the wall 25 immediately above opening 26 is a latch plate 27, which may be an angled member having one leg thereof extending normal to the plane of the wall, with a plurality of holes therein for receiving latch bars. A pair of latch bars 28 and 29 are slidably mounted to the plate-like member 22 so as to be selectively engaged within said latch plate 27 in apertures found in the flange 23. Pivotally connected to the latch bars 28 and 29 at the ends thereof distal the latch plate 27 is a generally U-shaped latch operator 31 which is mounted to the plate-like member 22 via a pair of pivot posts 32 which hold the pivot point of the latch operator outwardly from the plate-like member 2. Each end 31' of the operator is angled from the pivot point to the connection with the latch bar 28 or 29.

It should be noted from FIGS. 1 and 5 that the latch operator 31 extends below the bushing 19 such that elbow connector 16 connects to the receptacle intermediate the ends of operator 31. Thus when the connector 16 is in its closed circuit position, operator 31 cannot be moved sufficiently to retract the latch bars 28 and 29 from engagement with latch plate 27. An offset spring latch assembly 36 is affixed to the plate-like member 22 intermediate the latch bars 28 and 29 and is positioned such that a spring-loaded latch bar 37 included in the assembly 36 also engages an aperture in latch plate 27. Latch bar 37 is biased toward an engaged position and has an inclined rear surface 38 which acts as a cam surface to allow the latch bar 37 to retract as the plate-like member 22 is moved to its closed position. A pull ring 39 is provided for applying a retracting force to disengage the latch bar 37 from the latch plate 27.

All of the latch mechanisms and connector mechanisms heretofore described, with the exception of bushing 19, are normally located within the forward compartment 12 or on the "front" of plate-like member 22. On the back of plate like member 22 and normally disposed within the central compartment is a fuse mounting assembly 41. The fuse mounting assembly 41 includes a pair of insulators 42 and 43 spaced apart on plate-like member 22. Each insulator 42 or 43 supports a fuse holder 44 and a current bus 46 or 46'. Current bus 46 connects the bushing 19 and associated electrical conductors with the fuse holder 44 and fuse end supported by insulator 42. Current bus 46' is the disconnect bus supported by insulator 43. The disconnect bus 46' extends perpendicularly to plate-like member 22 through an opening in an insulative rear partition wall 47 separating the rear compartment 14 from the central compartment 13. An electrical contact 48 is housed in compartment 14 in cooperative position to engage bus 46' in a closed circuit position.

The opening formed in wall 47 is sufficiently large to allow the disconnect bus 46' to pivot into engagement with contact 48; however the opening is closed in the absence of the disconnect bus 46' by a shutter 49 which is slidably mounted to wall 47 and urged toward a closed position by a spring 51 which is connected to the cabinet 11 or wall 47. The spring 51 is connected to an upper flange 52 on said shutter by a non-conducting rod 53 or flexible member. Mounted to the disconnect bus 46' is a shutter operator 54 such as an elongated rod as shown in FIGS. 2, 3 and 4, which is offset from the disconnect bus 46' such that as the plate-like member 22 pivots toward its closed position the operator 54 precedes the disconnect bus 46' and engages the flange 52 to force the shutter 49 downwardly out of the way of disconnect bus 46'. As may be presumed the partition wall 47 and the shutter 49 as well as the operator 54 and a brace 56 therefor are made of a non-conductive electrically insulative material such as polyglass. The non-conducting rod 53 assures that the spring 51 does not contact the bus 46' in the energized position.

To move the mechanism from the close circuit to open circuit position, the technician must first engage the eye 21 on the elbow connector 16 and disconnect the connector 16. Only then can the latch operator 31 be raised sufficiently to disengage latch bars 29 and 29 from latch plate 27. He must also pull on ring 39 to retract the spring loaded latch bar 37, whereupon the plate-like member 22 carrying the fuse is free to pivot into the forward compartment 11. As the plate-like member 22 pivots, the disconnect bus 46' is lifted from engagement with the contact 48 and the shutter operator 54 releases the shutter 49 thereby closing the opening in wall 47. With the plate-like member 22 in the fully open position as shown in FIG. 3, the technician can visually confirm that the fuse is completely disconnected from the circuit and that he is isolated from the contact 48 in the rear compartment by the partition wall 47 and shutter 49.

While I have shown my invention in one form, it will be obvious to those skilled in the art that it is not so limited but is susceptible of various changes and modifications without departing from the spirit thereof.

What I claim is:

1. Apparatus for selectively positioning a fuse in a circuit open or circuit closed position, said apparatus being confined in a cabinet housing an electrical fuse wherein the fuse is operatively located in a central compartment and connected to electrical contacts in a pair of outer compartments on opposite sides of said central compartment, comprising:
   (a) support means integral with a partition intermediate said central compartment and one of said outer compartments for supporting said fuse in said circuit closed position within said central compartment and in said circuit open position within said one of said pair of outer compartments;
   (b) latch means for latching said support means with said fuse in said circuit closed position; and
   (c) means for selectively isolating the other of said pair of outer compartments from said central compartment when said fuse is in said circuit open position.

2. Apparatus as defined in claim 16 wherein said support means comprises:
   (a) a plate-like member pivotally mounted at one end thereof to said partition and co-extensive with an opening through said partition, with said member being selectively pivotally movable within said one of said pair of outer compartments;
   (b) insulated means for mounting said fuse to said plate-like member;
   (c) means for connecting said fuse to an electrical connector in said one of said outer compartments through said plate-like member; and
   (d) a bus bar affixed to said insulated means and extending therefrom for connecting said fuse to an electrical connection in said other outer compartment of said pair of outer compartments.

3. Apparatus as defined in claim 2 wherein said means for isolating comprises a shutter member slidably mounted to said partition separating said central compartment and said other outer compartment and co-extensive with said opening therethrough; means biasing said shutter member in position to cover said opening; and means connected to said plate-like member for urging said shutter away from said opening to admit said bus bar therethrough.

4. Apparatus as defined in claim 3 wherein said means for urging comprises an elongated rod extending from said plate-like member co-extensively with said bus bar and connected to said plate-like member closer to the pivotal mounting of said plate than is said bus bar such that rotation of said plate-like member to a closed position causes said rod to engage said shutter-like member and urge it to the open position before said bus can contact said shutter member.

5. Apparatus as defined in claim 2 wherein said latch means comprises:
   (a) at least one latch bar slidably mounted to said support means for selective movement into engagement with a latching plate mounted to said partition, said latching plate having at least one aperture therein for receiving said latch bar;

(b) a latch operator pivotally connected to one end of said latch bar and pivotally mounted to said support means proximal said latch bar such that angular movement of said latch operator imparts linear motion to said latch bar, with said electrical connector in said one of said outer compartments being cooperatively positioned to prevent pivotal motion of said latch operator while said electrical connector is electrically connected to said fuse.

6. Apparatus as defined in claim 5 wherein said latch means further comprises a secondary latch bar biased toward engagement with said latching plate.

7. Apparatus as defined in claim 2 wherein said latch means comprises:
  (a) at least one latch bar slidably mounted to said support means for selective movement into engagement with a latching plate mounted to said partition, said latching plate having at least one aperture therein for receiving said latch bar;
  (b) a latch operator pivotally connected to one end of said latch bar and pivotally mounted to said support means proximal said latch bar such that angular movement of said latch operator imparts linear motion to said latch bar, with said electrical connector in said one of said outer compartments being cooperatively positioned to prevent pivotal motion of said latch operator while said electrical connector is electrically connected to said fuse.

8. Apparatus as defined in claim 7 wherein said means for isolating comprises a shutter member slidably mounted to said partition separating said central compartment and said other outer compartment and coextensive with said opening therethrough; means biasing said shutter member in position to cover said opening; and means connected to said plate-like member for urging said shutter away from said opening to admit said bus bar therethrough.

9. Apparatus supporting a fuse in a multi-chambrial cabinet wherein electrical connectors are disposed within a pair of outer chambers in said cabinet with a central chamber disposed therebetween, the combination thereof with means pivotally supporting said fuse within said central chamber for selective movement into one outer chamber of said pair of outer chambers; means for locking said means for selective movement of said fuse in said central chamber; and automatic means providing electrical isolation between said central chamber and an other outer chamber of said pair of outer chambers when said fuse is disposed within said one outer chamber of said pair of outer chambers.

10. Apparatus as defined in claim 9 wherein said means for selective movement of said fuse comprises:
  (a) a wall-like member disposed between said central chamber and said one outer chamber, said wall-like member having an opening therethrough;
  (b) a plate-like member covering said opening and pivotally mounted to said wall-like member at the bottom of said opening for pivotal movement within said one outer chamber;
  (c) means for insulatively supporting said fuse on one side of said plate-like member; and
  (d) means for connecting said fuse to the electrical contact in said one outer chamber through said plate-like member.

11. Apparatus as defined in claim 10 wherein said central chamber and said other outer chamber are separated by a wall-like panel of insulative material having an opening formed therein, said automatic means comprising a slidably mounted shutter mounted for movement parallel to said panel, means for biasing said shutter into position to close said opening in said panel; and a shutter operator operatively connected to said plate-like member to move said shutter into position whereat said opening is unobstructed as said plate-like member pivots to its opening covering position.

12. Apparatus as defined in claim 11 wherein said means for biasing comprises a tension spring connected to said cabinet at one end and a non-conductive connector connected between the other end of said spring and said shutter.

13. Apparatus as defined in claim 11 further comprising:
  (a) a latch plate mounted proximal said plate-like member opposite the pivotal mounting thereof and having a plurality of apertures therethrough;
  (b) lock bar member slidably mounted to said plate-like member for selective movement into and out of said apertures in said latch plate; and
  (c) a latch operator for moving said lock bar relative to said apertures.

14. Apparatus as defined in claim 13 wherein said electrical connection is made via a port and bushing located intermediate said latch plate and said pivotal mounting of said plate-like member such that said latch operator cannot remove said lock bar member from said apertures while said electrical connection is made.

* * * * *